United States Patent
Kim et al.

(10) Patent No.: US 9,902,288 B2
(45) Date of Patent: Feb. 27, 2018

(54) HYDROGEN EXHAUST APPARATUS FOR FUEL CELL VEHICLE

(71) Applicant: Hyundai Motor Company, Seoul (KR)

(72) Inventors: Hyung Ki Kim, Seoul (KR); Ki Ho Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 80 days.

(21) Appl. No.: 14/936,081

(22) Filed: Nov. 9, 2015

(65) Prior Publication Data

US 2016/0167546 A1     Jun. 16, 2016

(30) Foreign Application Priority Data

Dec. 11, 2014   (KR) .................. 10-2014-0178106

(51) Int. Cl.
| | |
|---|---|
| *F16L 41/00* | (2006.01) |
| *B60L 11/18* | (2006.01) |
| *H01M 8/0662* | (2016.01) |

(52) U.S. Cl.
CPC ....... *B60L 11/1898* (2013.01); *H01M 8/0662* (2013.01); *H01M 2250/20* (2013.01); *Y02E 60/321* (2013.01); *Y02T 90/32* (2013.01)

(58) Field of Classification Search
CPC ............ B60L 11/1898; H01M 2250/20; Y02E 30/321
USPC ............................................. 137/312, 561 A
See application file for complete search history.

(56) References Cited

U.S. PATENT DOCUMENTS

| | | | |
|---|---|---|---|
| 8,580,444 B2 | 11/2013 | Lee et al. | |
| 2009/0155648 A1* | 6/2009 | Lee ................. | F17C 11/005 429/515 |
| 2014/0103051 A1* | 4/2014 | Kanezaki ............ | F17C 1/04 220/587 |

FOREIGN PATENT DOCUMENTS

| | | |
|---|---|---|
| JP | 2581592 Y | 2/1997 |
| JP | 2014-185714 A | 10/2014 |
| KR | 2009-0116907 A | 11/2009 |
| KR | 2011-0023352 A | 3/2011 |
| KR | 2013-0032186 A | 4/2013 |

* cited by examiner

*Primary Examiner* — Reinaldo Sanchez-Medina
(74) *Attorney, Agent, or Firm* — Mintz Levin Cohn Ferris Glovsky and Popeo, P.C.; Peter F. Corless

(57) ABSTRACT

An apparatus is provided for safely discharging hydrogen permeated and leaking from a fuel tank of a fuel cell vehicle. The hydrogen exhaust apparatus for a fuel cell vehicle collects and safely processes hydrogen permeating a tank, and quantitatively detects the hydrogen transmissive amount. Thus the apparatus has improved a shape and attachment manner of a dome protector mounted in a hydrogen fuel tank. The safety aspect of hydrogen discharged to the air is improved, and an active response to various controls by quantitatively detecting the hydrogen transmissive amount is implemented.

6 Claims, 2 Drawing Sheets

[ Cross-section along line A-A ]

HYDROGEN EXHAUST APPARATUS FOR FUEL CELL VEHICLE

CROSS-REFERENCE TO RELATED APPLICATION

This application claims under 35 U.S.C. § 119(a) the benefit of Korean Patent Application No. 10-2014-0178106 filed on Dec. 11, 2014, the entire contents of which are incorporated herein by reference.

BACKGROUND (a) Technical Field

The present invention relates to a hydrogen exhaust apparatus for a fuel cell vehicle, and more particularly, to an apparatus for safely discharging hydrogen that has permeated and is leaking from a fuel tank of a fuel cell vehicle.

(b) Background

In general, technology for applying hydrogen energy to a vehicle may provide considerable social benefits and directly contribution to an increased market size by reducing the potential amount of $CO_2$ produced, and facilitating non-petroleum dependence. Furthermore, utilizing hydrogen energy in a vehicle may improve industrial competitiveness.

However, hydrogen presents potential dangers concerning storage and transport. For example, the volume energy density of hydrogen is merely $\frac{1}{3,000}$ of gasoline. Typically, there are limited places within a vehicle to mount the hydrogen transport container. Utilizing hydrogen fuel for a fuel cell vehicle makes the requirement that the hydrogen be safely and compactly made, transported, and stored very important. Namely, technology for securing safety, compactly transporting and storing hydrogen is required. Currently, in this application a light and high interior pressure tank has been used.

Generally, a fuel cell vehicle using hydrogen as fuel is a vehicle which drives a motor by utilizing the charge generated by reacting the hydrogen and the oxygen, and thereby generates momentum utilizing the driving of the motor. A hydrogen storage system is mounted within the fuel cell vehicle. Conventionally, the hydrogen storage systems having the highest commercialized performance have a high pressure tolerance of 700 bars. To store the high-pressure hydrogen of the fuel cell vehicle, a tank adopting a carbon composite has been used. Typically, tanks are classified into type 3 or type 4 according to the composition of the liner materials.

Typically, the type 4 tank utilizes a plastic liner, resulting in a hydrogen transmission problem. For example, European regulations requires that the hydrogen permeation amount cannot exceed 6 cc/L/. In other words, the total amount of hydrogen discharged to the air is regulated thereby limiting the amount of hydrogen permeating the plastic liner that is discharged to the air from the type 4 tank. However, it is difficult to quantitatively measure the amount of hydrogen discharged to the air, and the hydrogen discharged to the air may create a safety concern.

The above information disclosed in this section is merely for enhancement of the understanding of the background of the invention and therefore it may contain information that does not form the prior art that is already known in this country to a person of ordinary skill in the art.

SUMMARY

The present invention provides a hydrogen exhaust apparatus for a fuel cell vehicle, for collecting and safely processing hydrogen permeating a tank. The hydrogen transmissive amounts may be quantitatively evaluated (e.g. monitored) by improving a shape and an attachment manner of a dome protector mounted in a hydrogen fuel tank, thereby improving the safety of hydrogen discharged to the air, and actively responding to various controls by quantitatively evaluating the hydrogen transmissive amount.

In one aspect, a hydrogen exhaust apparatus of a fuel cell vehicle may include a dome protector that may be attached to a dome portion of a fuel tank, a flow path that may be formed inside the dome protector, and an outlet that may be formed at one side of the flow path. In another aspect, hydrogen permeating the fuel tank may be collected inside the flow path and may be discharged through the outlet. The flow path formed in the dome protector may include a plurality of concentric circular flow paths that may be disposed in a form of a concentric circle, and a plurality of radial flow paths that may be radially disposed while in communication with the concentric circular flow paths. The outlet of the flow path formed in the dome protector may be formed at a substantially center portion of a dome.

An exhaust pipe may be connected to the outlet formed in the flow path of the dome protector. The hydrogen discharged through the outlet may be mixed with air within the exhaust pipe, may be diluted, and may be discharged to the air.

In another aspect, the hydrogen exhaust apparatus may quantitatively measure the amount of permeating hydrogen by utilizing an existing dome protector. The hydrogen may be safely discharged and processed by collecting permeated hydrogen without the discharge of the permeating hydrogen to the air. The hydrogen may be discharged to the exterior of a vehicle in when the hydrogen is mixed with air through the connection with the exhaust pipe and is diluted, thereby securing the safety of a vehicle.

BRIEF DESCRIPTION OF THE DRAWINGS

The above and other features of the present disclosure will be more apparent from the following detailed description taken in conjunction with the accompanying drawings.

Figure 1:
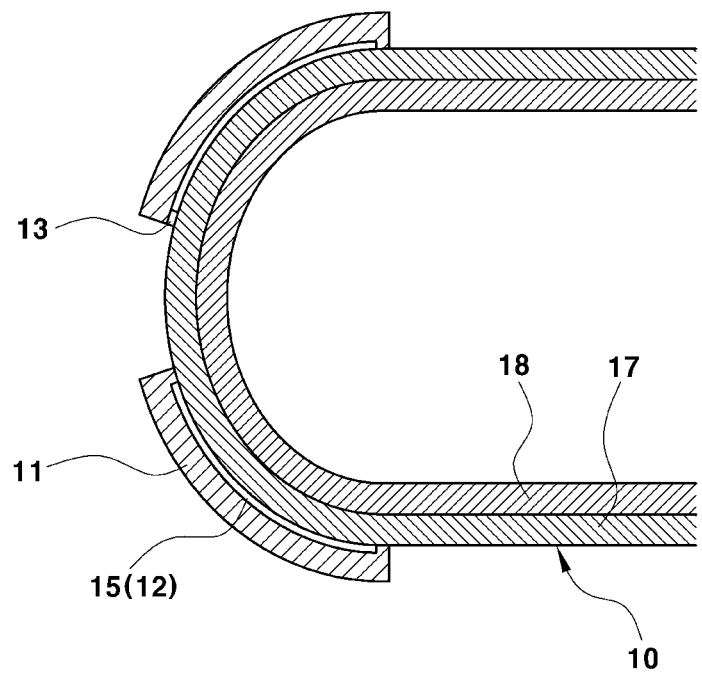
FIG. 1 is an exemplary embodiment of a cross-sectional view illustrating a hydrogen exhaust apparatus according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Advantages and features of the invention and methods of accomplishing the same may be understood more readily by reference to the following detailed description of exemplary embodiments and the accompanying drawings. The invention may, however, be embodied in many different provides and should not be construed as being limited to the embodiments set forth herein. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
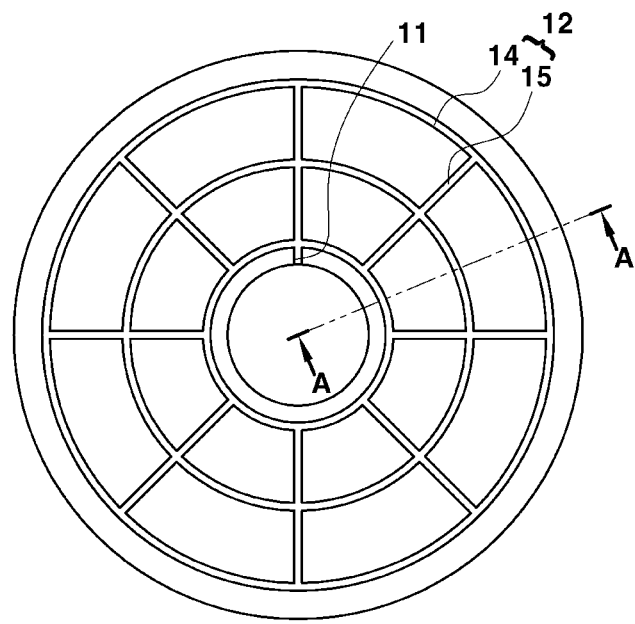
FIG. 2 is an exemplary embodiment of a front view illustrating the hydrogen exhaust apparatus according to the exemplary embodiment of the present invention.

FIG. 1 is an exemplary embodiment of a cross-sectional view illustrating a hydrogen exhaust apparatus according to an exemplary embodiment of the present invention. FIG. 2 is an exemplary embodiment of a front view illustrating the hydrogen exhaust apparatus according to the exemplary embodiment of the present invention. As illustrated in FIGS. 1 and 2, the hydrogen exhaust apparatus may have a structure, capable of collecting hydrogen permeating a fuel tank, and safely discharging the collected hydrogen to the air. Further, the hydrogen exhaust apparatus may include a fuel tank 10 formed of a carbon composite material layer 17 and a plastic liner layer 18, and dome protectors 11 shaped like a dome that may be attached to dome portions at both sides of the fuel tank 10, respectively. In other words, the dome protector 11 may be used for reinforcing the strength of the dome portion of the tank, which may have a weak hardness.

Further, a flow path 12 may be formed on the interior of (e.g. an interior surface) the dome protector 11, to allow hydrogen to flow and be collected. In some exemplary embodiments, the flow path 12 may have a web structure. For example, the flow path 12 formed in the dome projector 12 may include a plurality of concentric circular flow paths 14 having a form, in which circular flow paths may be disposed in a concentric circle increasing to from an initial diameter increasing to a larger diameter. A plurality of radial flow paths 15 may be radially disposed while radially crossing and may be in communication with the respective concentric circular flow paths 14.

Figure 3:
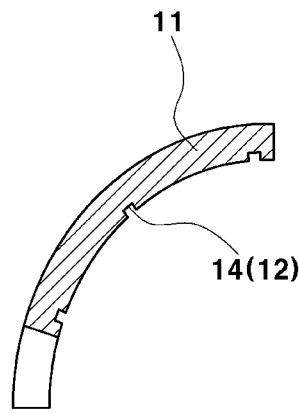
FIG. 3 is an exemplary embodiment of a cross-sectional view taken along line A-A of FIG. 1.

Further, oxygen may permeate the plastic liner layer 18 and the carbon composite material layer 17 of the fuel tank 10 and may move along the concentric circular flow paths 14 and the radial flow paths 15 which may be in communication with each other and may be obstructed within the flow path 12. As illustrated in FIG. 3, the flow path 12 may be formed by processing recesses disposed in an interior surface of the dome protector. Further, an outlet 13 open to the exterior may be formed at one side of the flow path 12. For example, an end of a center side of the dome of any one radial flow path 15, and hydrogen, which has moved along the concentric circular flow paths 14 and the radial flow paths 15, may be discharged from an interior side of the flow path through the outlet 13. In particular, the outlet 13 of the flow path 12 formed in the dome protector 11 may be positioned at the substantially center portion of the dome. In other words, one side of a surface, may be cut in a circular shape (or the like), at substantially the center of the dome structure of the protector.

Figure 4:
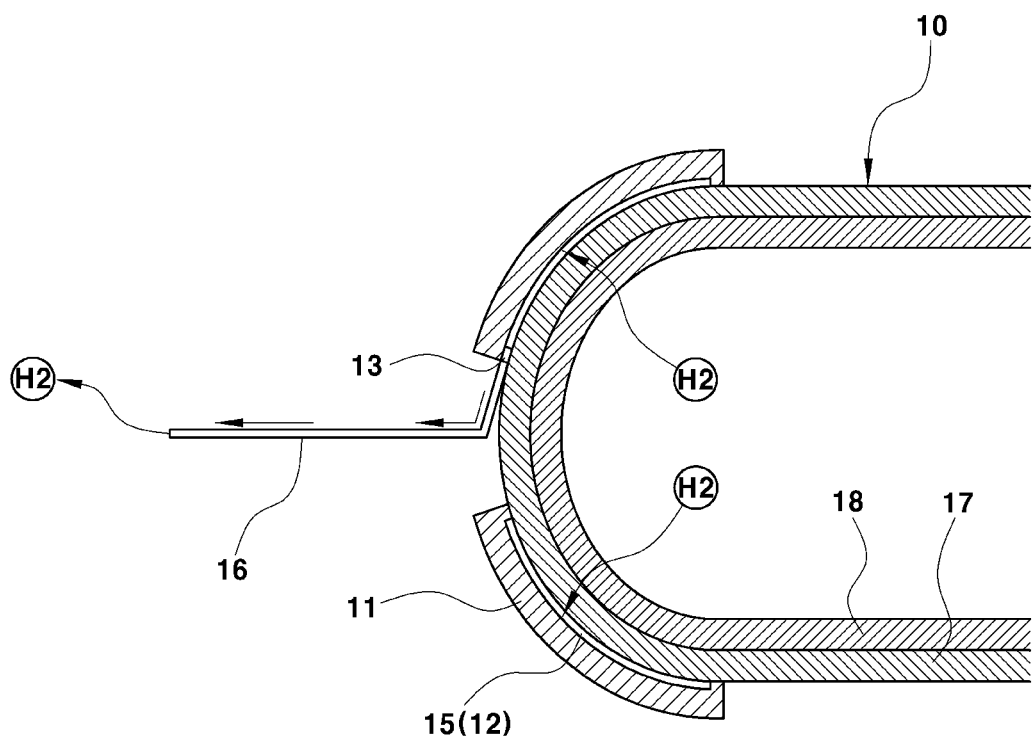
FIG. 4 is an exemplary embodiment of a cross-sectional view illustrating a use state of the hydrogen exhaust apparatus according to the exemplary embodiment of the present invention.

Furthermore, as shown in FIG. 4 an exhaust pipe 16 may be connected to the outlet 13 of the flow path 12. The hydrogen discharged through the outlet 13 of the flow path 12 may be mixed with air within the exhaust pipe and may be diluted while flowing along the exhaust pipe 16, and may be safely discharged to the air. A use state of the hydrogen exhaust apparatus configured as described above will be described below. FIG. 4 is an exemplary embodiment of a cross-sectional view illustrating a use state of the hydrogen exhaust apparatus according to the exemplary embodiment of the present invention. As illustrated in FIG. 4, hydrogen permeating the plastic liner layer 18 and the carbon composite material layer 17 of the fuel tank 10, filled with hydrogen, may be collected inside the flow path 12.

The dome protector 11 may be bonded to the fuel tank 10 to maintain the sealing performance. A portion of the dome protector 11 may remain unbonded and provide the outlet 13 that may collect hydrogen. The collected hydrogen may be discharged to the air, and a level of transmittance of the tank may be quantitatively detected by measuring the amount of hydrogen that may be discharged by utilizing the outlet 13 through which hydrogen is discharged. The exhaust pipe 16 may connected to the outlet 13 of the flow path 12. The hydrogen discharged through the outlet 13 may flow into the exhaust pipe 16 and may further flow along the exhaust pipe 16 to be discharged to the air through a distal end of the exhaust pipe 16. When the hydrogen exhaust apparatus includes the exhaust pipe, hydrogen may be mixed with air inside the exhaust pipe and may be diluted, and safely discharged. The hydrogen may be discharged by a safe method, thereby improving safety of a vehicle.

As described above, the present invention collects permeating hydrogen by changing a shape and an attachment method of the dome protector, discharging the collected hydrogen, quantitatively detecting the hydrogen transmissive amount, and safely discharging the hydrogen through the connection with the exhaust pipe.

While this disclosure has been described in connection with what is presently considered to be exemplary embodiments, it is to be understood that the present disclosure is not limited to the disclosed exemplary embodiments but on the contrary, is intended to cover various modifications and equivalent arrangements included within the spirit and scope of the accompanying claims. In addition, it is to be considered that all of these modifications and alterations fall within the scope of the present disclosure.

What is claimed is:

1. A hydrogen exhaust apparatus for a fuel cell vehicle, comprising: a dome protector attached over a dome portion of a fuel tank, wherein the fuel tank comprises an inner layer and an outer layer; a flow path formed between an inside of the dome protector and the outer layer of the fuel tank; and an outlet formed at one side of the flow path, wherein hydrogen permeating the fuel tank is collected inside the flow path and discharged through the outlet.

2. The hydrogen exhaust apparatus of claim 1, wherein the flow path formed in the dome protector includes:
   a plurality of concentric circular flow paths disposed in a concentric circle, and
   a plurality of radial flow paths radially disposed while in communication with the concentric circular flow paths.

3. The hydrogen exhaust apparatus of claim 1, wherein the outlet of the flow path formed in the dome protector is formed at a center portion of a dome.

4. The hydrogen exhaust apparatus of claim 1, wherein an exhaust pipe is connected to the outlet formed in the flow path of the dome protector, to mix hydrogen discharged through the outlet with air within the exhaust pipe and diluted, and to discharge to the air.

5. The hydrogen exhaust apparatus of claim 1, wherein the fuel tank includes a carbon composite material layer and a plastic liner layer.

6. The hydrogen exhaust apparatus of claim 2, wherein the outlet of the flow path formed in the dome protector is formed at a center portion of a dome.

\* \* \* \* \*